Figure 1:
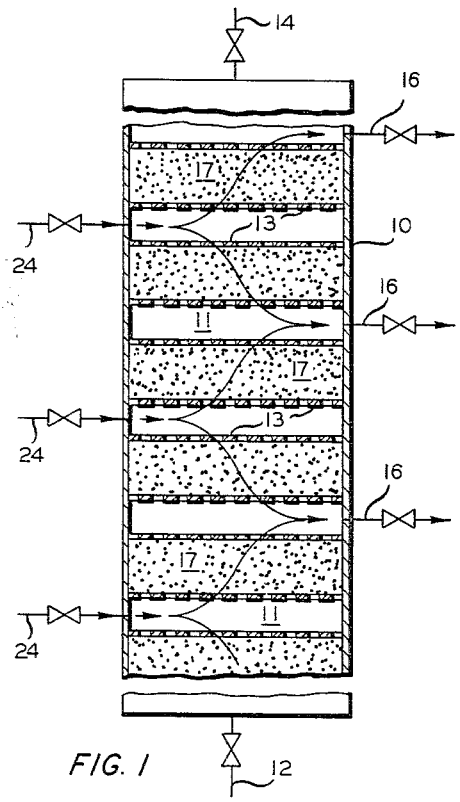

Nov. 23, 1965   E. W. PITZER ETAL   3,219,587
RAPID, LOW TEMPERATURE CATALYST REGENERATION
Filed Sept. 30, 1960

INVENTORS
E. W. PITZER
H. R. SAILORS
BY Hudson & Young
ATTORNEYS

United States Patent Office 3,219,587
Patented Nov. 23, 1965

3,219,587
RAPID, LOW TEMPERATURE CATALYST
REGENERATION
Emory W. Pitzer and Howard R. Sailors, Bartlesville, Okla., assignors to Phillips Petroleum Company, a corporation of Delaware
Filed Sept. 30, 1960, Ser. No. 59,616
7 Claims. (Cl. 252—419)

This invention relates to an apparatus and process for rapid, low temperature regeneration by oxidation of coke deposit with $O_2$-containing gas.

A major limitation on many catalytic hydrocarbon conversion processes conducted at elevated temperatures is the removal of coke which deposits on the catalysts during the conversion period. This removal requires considerable time—frequently as much or more time than the process period—and it subjects the catalyst to elevated temperatures which deactivate the catalyst and damage the reactor. Considerable instrumentation and operating time are devoted to an attempted control of regeneration temperatures.

The usual method for controlling regeneration temperature comprises limiting oxygen in the regeneration gas. At some low concentration, for example, two percent, the regeneration temperature is maintained at a fairly low level. Under these conditions an equilibrium is established between the heat produced by oxidation of the carbon and the heat carried out of the catalyst bed by the regeneration gas and the catalyst tube walls. This equilibrium temperature is usually 200–300° F. above the reaction temperature even though a low concentration of oxygen is used. Lowering the oxygen concentration to further reduce the regeneration temperature results in prohibitively long regeneration periods.

This invention is concerned with more efficient removal of the coke deposit on a catalyst by oxidation at lower temperatures than conventionally used and in vastly shorter time.

Accordingly, the principal object of the invention is to provide an improved process and apparatus for regenerating catalysts contaminated with coke deposit. Other objects are: (1) to greatly reduce the time used in catalyst regeneration, (2) to increase the proportion of on-stream time in catalytic operations involving alternate periods of conversion of feed and regeneration of the catalyst, (3) to increase the proportion of on-stream time in n-butane catalytic dehydrogenation, and (4) to improve the efficiency of regeneration of alumina-chromium oxide catalyst. Other objects of the invention will become apparent to one skilled in the art upon consideration of the accompanying disclosure.

A broad aspect of the invention comprises contacting coked catalyst with regeneration gas containing free-$O_2$ in the range of 5 to 35 volume percent, preferably air, at sufficiently high space velocity that the increased velocity decreases the regeneration temperature substantially over maximum regeneration temperatures which are produced by regeneration with air at low space velocities. The invention is based on the discovery that increasing the space velocity of regeneration air charged to coked catalyst beds results in increasing regeneration temperatures only up to a limit, and that further increases in space velocity result in decreasing regeneration temperatures. This decrease in temperature with increased space velocity is due to increasingly incomplete utilization of the oxygen in the air as the contact time of the air decreases below a critical value. Thus, the heat released for each unit of regeneration air can be controlled so that the exit temperature of the air does not exceed that at which the catalyst starts to be damaged.

The process of the present invention has several advantages. One advantage is that catalyst beds can be regenerated in very short times in the range of five minutes down to one minute or even less. Another advantage is that close control of oxygen content is unnecessary, thus eliminating the need for recycling inert effluent regeneration gas and the difficulties of maintaining a leak-free system. Obviously, use of air diluted with inert gas for regeneration is within the scope of the present invention, but less dilution can be used or it can be done away with entirely to advantage.

The exact point at which the reversal of the direction of temperature change with space velocity change takes place depends on several factors, these including catalyst particle size, the amount of coke deposition on the catalyst and the oxygen content of the regeneration gas. These relationships between the variables can readily be determined by tests of any specific catalyst which is to be regenerated by the process of the present invention. The example described in a subsequent part of this description shows with reference to a specific catalyst one specific set of data over a range of regeneration air space velocities.

The invention is advantageous in a butane dehydrogenation system in which n-butane is dehydrogenated in contact with a particulate catalyst consisting essentially of alumina and chromium oxide $Cr_2O_3$. In one plant of this type, operation involves a cycle including about one hour on dehydrogenation (on-stream) followed by an hour on regeneration. Thus, only about one half of the investment in catalyst and chamber capacity is actually in productive use at any given time. By changing the regeneration method so that only about 5 minutes or less is required for each catalyst regeneration allows at least twelve times as much time on dehydrogenation as on regeneration when using a one-hour dehydrogenation period. Thus, the use of the invention proportionately increases the production of butenes for a given amount of catalyst and reaction chamber capacity.

The advantage of the short regeneration time requirement may also be taken partially in the form of a shortened process cycle with the attendant increase in efficiency and yield of olefins and partially in the form of reduced catalyst and reactor requirement. In this modification, the dehydrogenation period can be about 15 minutes and the regeneration period about one to five minutes. Improvement in selectivity of conversion in the shortened conversion period results in a higher ultimate yield and the increased percentage of the process cycle spent on dehydrogenation reduces the catalyst and reactor requirement required. The optimum ratio of time spent on dehydrogenation to time on regentration is a matter of economics and can be determined by well known methods.

For the practice of this invention, it is necessary that the reactor be of such shape that the regeneration gas path is short enough to enable regeneration gas to pass through the catalyst bed in the required quantitites without exceeding the velocity of sound. In n-butane dehydrogenation, reaction conditions include a temperature in the range of 1000 to 1200° F., a pressure below about 50 p.s.i.g., a space velocity in the range of 500 to 10,000 v./v./hr., and a catalyst consisting essentially of alumina and $Cr_2O_3$ in which the $Cr_2O_3$ may vary from about 10 to about 60 percent by weight. The preferred catalyst composition is 80 percent $Al_2O_3$ and 20 percent $Cr_2O_3$ (by weight). Another butane dehydrogenation catalyst consists primarily of calcium phosphate and nickel phosphate.

The invention is applicable to other types of catalysts which have been contaminated with carbonaceous deposit during a hydrocarbon conversion process. Usually, the amount of coke on the catalyst is in the range of 1 to 5 weight percent of the catalyst. Ordinarily, in n-butane dehydrogenation, the carbonaceous coke deposit is about 3 weight percent of the catalyst when regeneration is effected. However, when utilizing the process of the invention, it is feasible to regenerate after shorter onstream periods when the carbonaceous deposit amounts to only 1-2 weight percent of the catalyst and use extremely short regeneration time such as two minutes or less.

Figure 2:
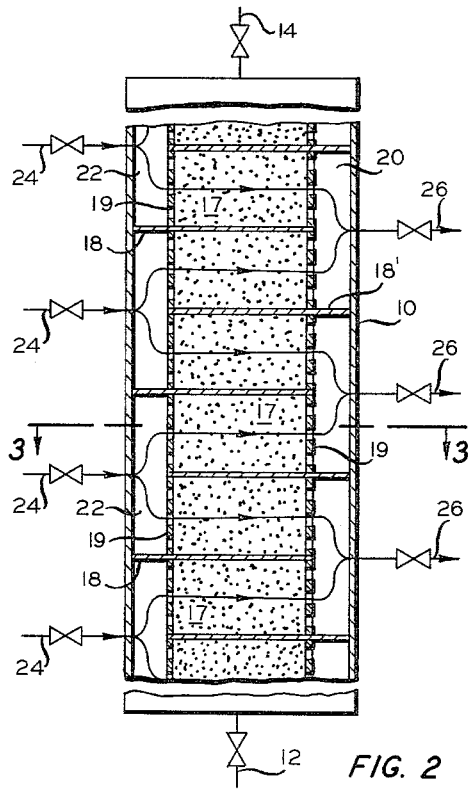
Figure 4:
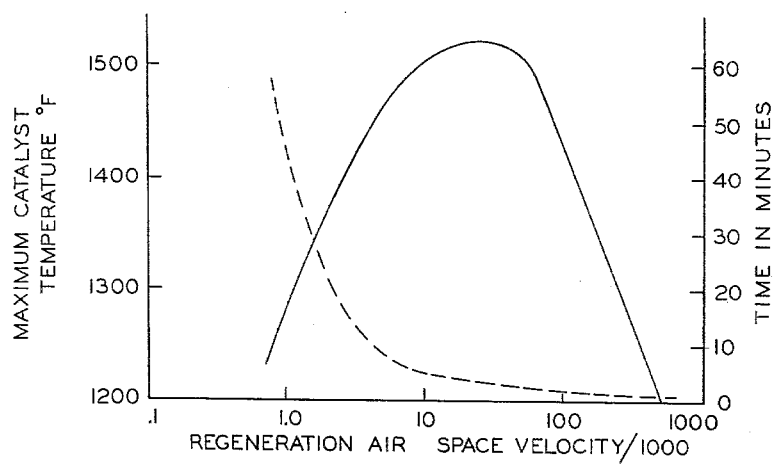
Figure 3:
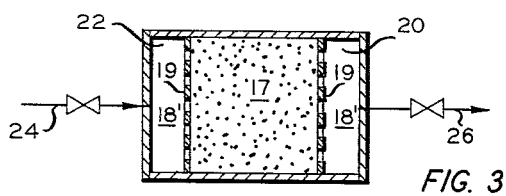

A more complete understanding of the invention may be had by reference to the accompanying drawing of which FIGURE 1 is a schematic elevation of an apparatus for effecting the invention; FIGURE 2 is a schematic showing in elevation of a preferred arrangement of apparatus for effecting the invention; FIGURE 3 is a sectional view taken on the line 3—3 of FIGURE 2; and FIGURE 4 is a graphical showing of data obtained in regeneration with air of alumina-chromium oxide butane dehydrogenation catalyst containing about 3 weight percent carbonaceous coke as set forth in the example below.

Referring to FIGURE 1, a regenerator-reactor comprising a shell 10 is provided with a feed inlet 12 and a product effluent line 14. Catalyst beds 17 are spaced apart on perforated plates or trays 13 to provide open spaces 11 between beds. Lines 24 feed regeneration gas to alternate open spaces 11 at one side of the shell and effluent lines 26 take off combustion gases from the alternate spaces at the opposite side of the shell.

Referring to FIGURES 2 and 3, a reactor-regenerator comprises a shell 10 provided with a feed inlet 12 and effluent outlet 14. A series of catalyst beds 17 are positioned on solid imperforate sheets 18 and are enclosed on the sides by perforate members 19. There are two series of solid plates 18, one series extending laterally from one side of the shell beyond the center or axis thereof but not entirely across the shell. The other series of plates 18' extend from the opposite side of the shell laterally thereof in corresponding manner to the series of plates 18. In this construction, vapor spaces 20 are provided on one side of the catalyst beds while vapor spaces 22 are provided on the opposite sides of the catalyst beds. Regeneration gas inlet conduits 24 lead into spaces 22 while effluent conduits 26 lead from spaces 20. With this arrangement, regeneration gas (air) injected thru conduits 24 passes laterally thru the catalyst beds and gas from any one inlet conduit passes thru two adjacent beds to two outlet conduits 26. This construction assures a short flow path of regeneration gas thru the beds while providing a relatively extensive flow path for n-butane feed back and forth thru the reactor from inlet conduit 12 to outlet conduit 14.

It should be noted that the reactor-regenerator is of rectangular cross section with the open spaces on two opposite sides of the beds and that the beds extend completely across the shell between the other two opposite sides.

It is also feasible to omit perforated members 19 and round the inside corners of the shell so that the entire vessel is filled with catalyst. This simplifies the structure but the contacting efficiency is lowered considerably. In either arrangement, high regeneration space velocity can be used without excessive linear velocities being encountered.

The following example is presented to illustrate the invention but is not to be interpreted as to unduly limit the same.

*Example*

Butane dehydrogenation catalyst in the form of ⅛" x ⅛" pills consisting essentially of 80 percent alumina and 20 percent $Cr_2O_3$ (by weight) and containing about 3 weight percent of carbonaceous coke deposited thereon in a butane dehydrogenation reaction conducting at 750 n-butane space velocity, at about atmospheric pressure, and at about 1100° F., was regenerated with air using 10 cc. portions of catalyst in each test at progressively greater air flow rates from a space velocity of about 700 v./v./hr. up to about 500,000 v./v./hr. The regeneration time in minutes is shown in the dotted line graph (FIG. 4) while the temperature in ° F. is shown in the solid line graph.

The data show that regeneration temperatures increased up to regeneration air flow rates of 20,000-30,000 v./v./hr. and thereafter decreased with further increases in velocity or air flow rate. With this catalyst the regeneration can be effected with high air flow rates at times substantially less than 5 minutes and even as low as one minute to remove 3 percent coke deposit without exceeding a temperature of about 1300° F.

The invention provides a method of determining the optimum flow rate of regeneration gas to be used in regenerating any catalyst bed containing coke deposit comprising contacting separate individual samples of the catalyst at combustion supporting temperatures with regeneration gas such as air at progressively greater flow rates with successive samples so as to reach a maximum catalyst temperature on an intermediate sample and successively lower temperatures on succeeding samples, thereby establishing flow rates which are higher than that which develops maximum catalyst temperature and which effect temperatures below a maximum safe catalyst temperature without degrading the catalyst. Flow rates to be utilized start below about 10,000 and run up to 100,000 v./v./hr.

Certain modifications of the invention will become apparent to those skilled in the art and the illustrative details disclosed are not to be construed as imposing unnecessary limitations on the invention.

We claim:

1. A process for regenerating a bed of particulate catalyst at fast oxidation rates, said catalyst having coke deposited thereon during a hydrocarbon conversion process which comprises flowing regeneration gas containing $O_2$ in the range of 5 to 35 volume percent at about atmospheric temperature thru said bed at oxidation temperature, at a flow rate above 10,000 volumes per volume of catalyst per hour and substantially greater than that at which reversal of direction of temperature change from increasing to decreasing takes place and at which substantially incomplete utilization of said $O_2$ occurs so as to remove the major portion of coke from said catalyst bed at a temperature below maximum temperature at said reversal and below the temperature of catalyst deterioration, whereby the regeneration time is reduced.

2. The process of claim 1 wherein said gas is atmospheric air.

3. The process of claim 1 wherein the amount of coke on said catalyst is in the range of about 1 to 5 weight percent.

4. The process of claim 3 wherein regeneration time is less than 2 minutes.

5. The process of claim 1 wherein said catalyst bed is regenerated by passing said gas transversely therethru.

6. A process for regenerating an elongated bed of particulate catalyst at fast oxidation rates, said catalyst comprising essentially $Al_2O_3$ and $Cr_2O_3$ containing coke in the range of 1 to 5 weight percent of the catalyst deposited thereon in a hydrocarbon conversion process which comprises passing transversely thru said bed regeneration gas containing $O_2$ in the range of about 5 to 35 volume percent introduced at about atmospheric temperature at a space velocity above 10,000 volumes per volume of catalyst per hour and greater than that at which reversal of direction of temperature change from increasing to decreasing occurs while said bed is at combustion-supporting temperature so as to burn off the major portion of said coke in a period of less than 5 minutes.

7. The process of claim 6 wherein said period is less than 2 minutes.

References Cited by the Examiner
UNITED STATES PATENTS

| | | | |
|---|---|---|---|
| 2,167,650 | 8/1939 | Grosse | 260—683.3 |
| 2,321,294 | 6/1943 | Hemminger et al. | 252—419 |
| 2,330,710 | 9/1943 | Hemminger | 252—419 |
| 2,368,507 | 1/1945 | Welty | 252—419 |
| 2,383,218 | 8/1945 | Schulze | 252—419 X |
| 2,398,126 | 4/1946 | Thacker et al. | 260—683.3 |
| 2,399,560 | 4/1946 | Murphree | 23—288 |
| 2,546,031 | 3/1951 | Hanson | 252—416 X |
| 2,548,519 | 4/1951 | Cummings | 23—288 |

OTHER REFERENCES

Van Deemter, J. J.: "Heat and Mass Transfer in a Fixed Catalyst Bed During Regeneration," Industrial and Engineering Chemistry, volume 45, No. 6, pages 1227–1232, Tp 1 A 58.

Payne, J. W., Lecthaler, C. H., and Drew, R. D.: "Countercurrent Heating and Cooling of Granular Solids With Gases" Industrial and Engineering Chemistry, volume 45, No. 6, pages 1233–6, June 1953, TIP–A58.

MAURICE A. BRINDISI, *Primary Examiner.*

JULIUS GREENWALD, *Examiner.*